(12) United States Patent
Poletto et al.

(10) Patent No.: US 6,701,418 B2
(45) Date of Patent: Mar. 2, 2004

(54) AUTOMATIC DETECTION AND CORRECTION OF RELATIVELY REARRANGED AND/OR INVERTED DATA AND ADDRESS SIGNALS TO SHARED MEMORY

(75) Inventors: Christopher J. Poletto, Derwood, MD (US); Judd E. Heape, Dallas, TX (US); Steven Trautmann, Tsukuba (JP)

(73) Assignee: Texas Instruments Incorporated, Dallas, TX (US)

( * ) Notice: Subject to any disclaimer, the term of this patent is extended or adjusted under 35 U.S.C. 154(b) by 87 days.

(21) Appl. No.: 09/998,331

(22) Filed: Dec. 3, 2001

(65) Prior Publication Data
US 2002/0120825 A1 Aug. 29, 2002

Related U.S. Application Data
(60) Provisional application No. 60/255,856, filed on Dec. 15, 2000.

(51) Int. Cl.[7] ............................................... G06F 13/00
(52) U.S. Cl. ........................ 711/147; 711/202; 711/211; 710/316; 712/300
(58) Field of Search ................. 710/316; 712/300; 711/211, 202, 147

(56) References Cited

U.S. PATENT DOCUMENTS

| | | | | |
|---|---|---|---|---|
| 4,740,972 A | | 4/1988 | Rutherford, Jr. ............ | 714/807 |
| 5,095,525 A | * | 3/1992 | Almgren et al. ............ | 711/202 |
| 5,987,581 A | * | 11/1999 | Nale ......................... | 711/202 |
| 6,327,651 B1 | * | 12/2001 | Dubey et al. ................ | 712/300 |

* cited by examiner

*Primary Examiner*—Glenn Gossage
(74) *Attorney, Agent, or Firm*—Robert D. Marshall, Jr.; W. James Brady, III; Frederick J. Telecky, Jr.

(57) ABSTRACT

A set of related methods for detecting the existence and exact nature of any rearrangements and/or inversions of address lines and/or data lines to a memory device, relative to a second set of address lines and/or data lines to the same memory, are disclosed. Moreover, a set of related methods for correcting these relative rearrangements and/or inversions are disclosed. These methods allow meaningful access to memory shared by two or more devices using different address and data paths in the case where the relative nature of the address and data paths is unknown a priori. These methods of detecting and correcting such mismatches in separate address and data lines to shared memory may be implemented either in hardware or software or a combination of both.

12 Claims, 4 Drawing Sheets

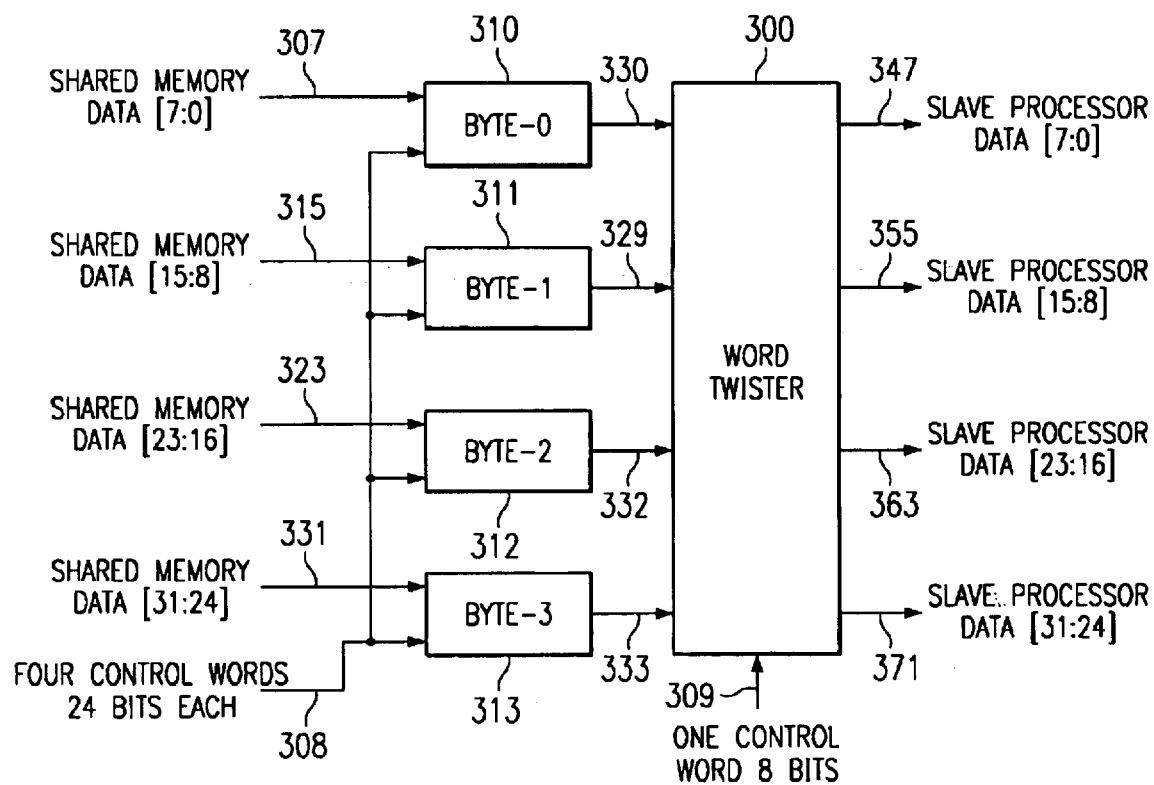
FIG. 3
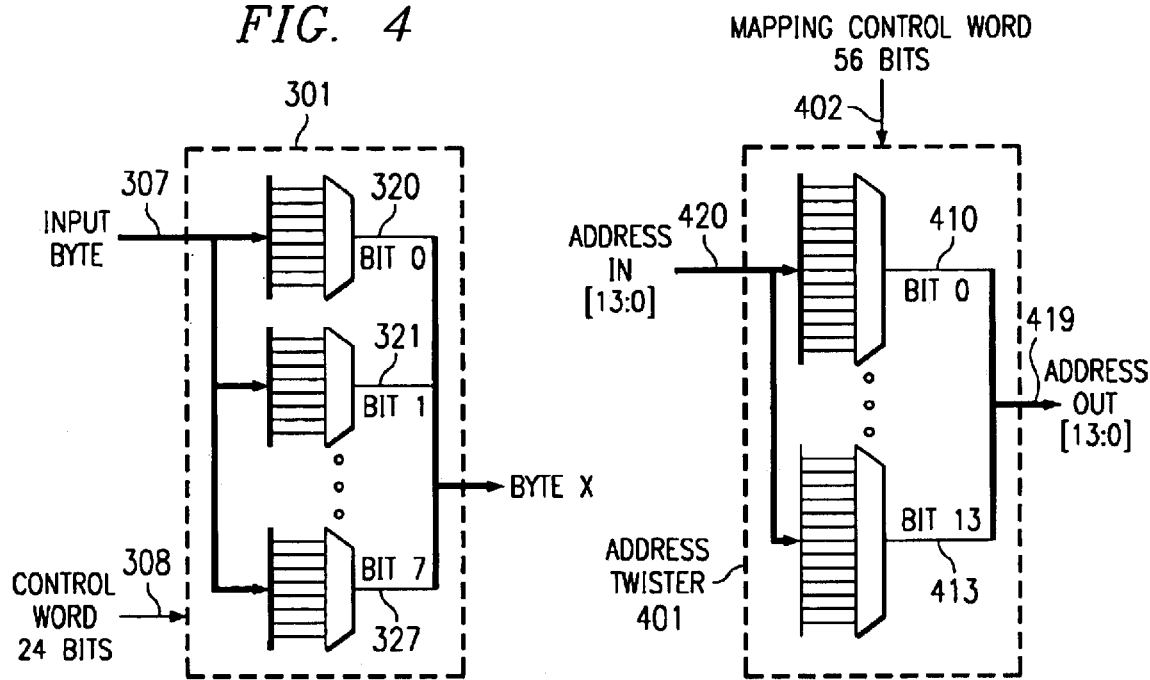
FIG. 4
FIG. 7

US 6,701,418 B2

AUTOMATIC DETECTION AND CORRECTION OF RELATIVELY REARRANGED AND/OR INVERTED DATA AND ADDRESS SIGNALS TO SHARED MEMORY

This application claims priority under 35 USC §119(e)(1) of Provisional Application No. 60/255,856, filed Dec. 15, 2000.

TECHNICAL FIELD OF THE INVENTION

The technical field of this invention is sensing inverted, rearranged address or data lines in the connection between a data processor and memory.

BACKGROUND OF THE INVENTION

Typical computing systems include memory either on the main system board or installed in sockets. Data bits wired between the host central processing unit (CPU) and chipset (first system) and the memory are commonly rearranged on the first system's printed circuit board. This is illustrated in FIG. 1. Rearranging data lines is usually of no consequence since data written will undergo the inverse mapping when retrieved. However, for a device to share data in memory with the first system without using the same data lines, this data line reordering must be recognized and remedied. Also, because of the multiplexed row/column addressing scheme used by dynamic random access memories (DRAMs), for example, and the need to support DRAMs with different row/column sizes, first systems commonly must rearrange the address bits of the memory address. For a device to share memory with the first system and maintain a contiguous address map without using the same address lines, this address line reordering must be recognized and remedied. In addition, some motherboards invert certain address bits, and in principle could invert some or all data bits as well. Likewise, for a device to share memory with the first system effectively without using the same address lines, this inversion of address lines must be recognized and remedied. Similarly inversion of any data lines in principle could be detected and remedied.

SUMMARY OF THE INVENTION

In many systems using standard memory, for example DRAM, certain manipulations including rearranging and inversion of address lines and data lines are employed. The result of these manipulations is that the data becomes unrecognizable and/or not locatable without detailed knowledge of the address line and data line manipulation, making the stored data unusable when accessed through alternative address lines and/or data lines.

To remedy this situation, the present invention determines the exact nature of rearrangements and/or inversions of address lines and/or data lines, and makes corresponding corrections.

One example application is a processor enhanced memory module (PEMM), which is compatible with both a Joint Electron Device Engineering Council (JEDEC) standard and an Electronics Industries Association of Japan (EIAJ) standard. This device plugs into a standard dual in-line memory module (DIMM) slot on a standard personal computer (PC), but on the computer printed circuit board, the processor uses separate address and data lines from the host PC.

Without the capability of the current invention, this device could not be used unless the address line and data line manipulations were known a priori and compensated for in a fixed way. However, by using the technique described here, the PEMM can be used in a PC where the address line and data line manipulations are not known a priori, and the compensation is not fixed before hand.

This invention should prove useful in many situations where a storage device is accessed through more than one set of address and/or data lines and the exact manipulations of one (or more) sets of storage lines is unknown beforehand.

BRIEF DESCRIPTION OF THE DRAWINGS

These and other aspects of this invention are illustrated in the drawings, in which:

FIG. 3 illustrates a multiplexer-based configurable crosspoint switch (CCS) for data correction;

FIG. 4 illustrates the byte-twister portion of a multiplexer-based configurable crosspoint switch (CCS) for data correction;

FIG. 7 illustrates the address portion of a multiplexer-based configurable crosspoint switch (CCS) for address correction.

DETAILED DESCRIPTION OF PREFERRED EMBODIMENTS

The present invention describes a set of methods for automatically determining the exact nature of the rearrangement and/or inversion of address and/or data lines in any first system, relative to another system with independent address and/or data lines to the same memory, and a set of methods for automatically correcting this relative rearrangement and/or inversion.

Figure 1:
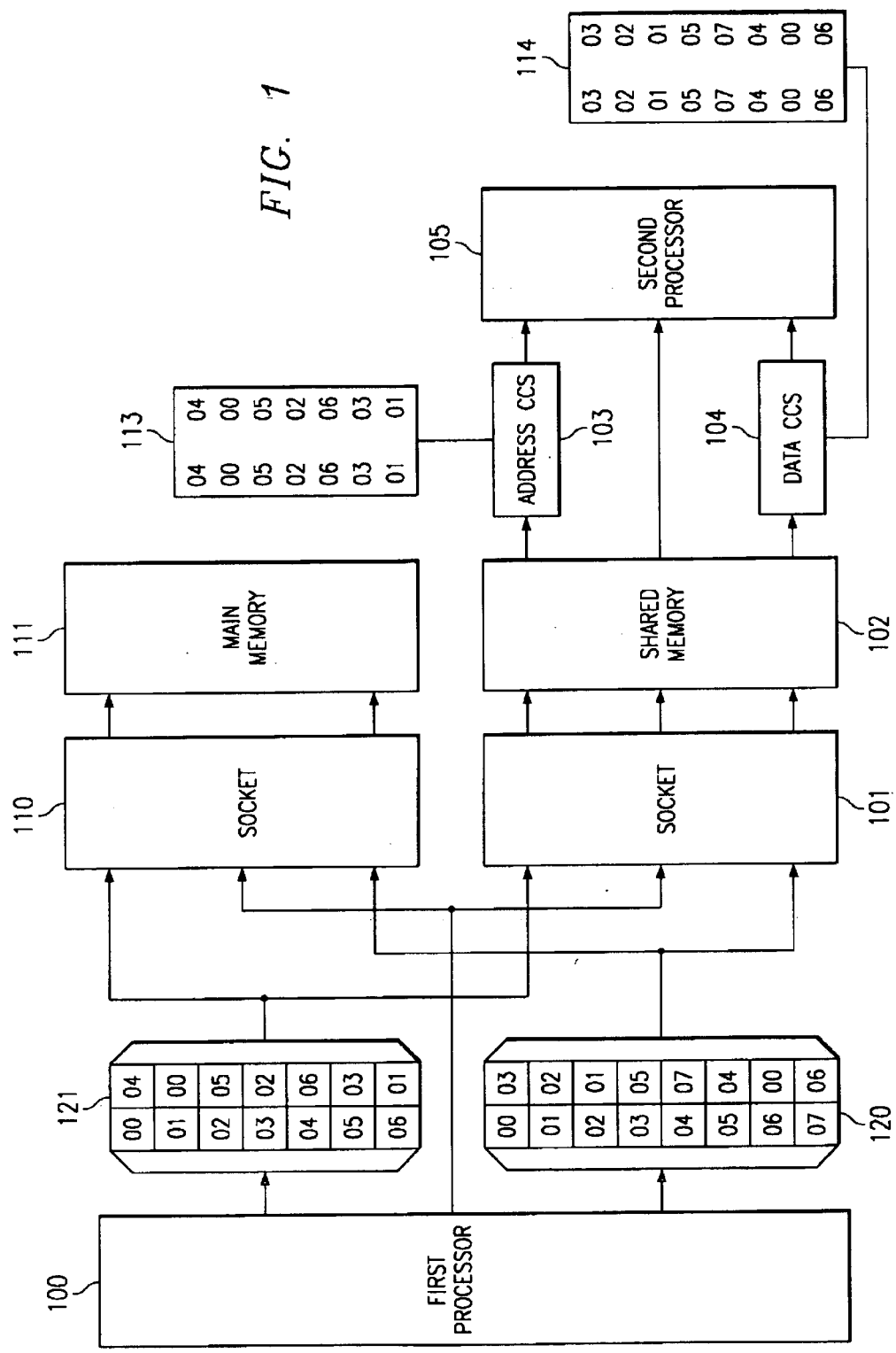
FIG. 1 illustrates a system block diagram before address and data map correction.

A system block diagram with data and address line rearrangement in blocks 120 and 121 respectively is illustrated in FIG. 1. Notice that the elements to which data is routed through the lower memory socket 101 consist of shared memory 102, the configurable cross-point switch (CCS) elements 103 and 104, and the second processor 105. Also shown is the path for data and address routed through socket 110 to main memory 111. FIG. 1 shows the system before address and data map correction, with the CCS elements in this case configured as straight, point-to-point connections.

The mapping for the host system's data and address lines can be determined by writing appropriate patterns to shared memory, and then in turn reading them from the shared memory. It is not significant which processor device does the writing and which does the reading, and each device could in fact be involved in both reading and writing. It is important that each pattern written by a device using one set of data and address lines be read by a device using a different set of data and address lines. In this case however, the processor that is not in control of the CSS elements is the processor to write these patterns (instigating processor). The processor in control of the CCS elements is thus the processor to read these patterns from shared memory, and correct the mapping by configuring the CCS elements (target processor) in this example. Thus in the system shown in FIG. 1 the second processor 105 is the instigating processor, and the first processor 100 is the target processor. This might seem unusual since the CCS elements lie next to the second processor. Nonetheless, to show the flexibility of this method, control over the CCS elements is given to the first processor in this example.

Figure 2:
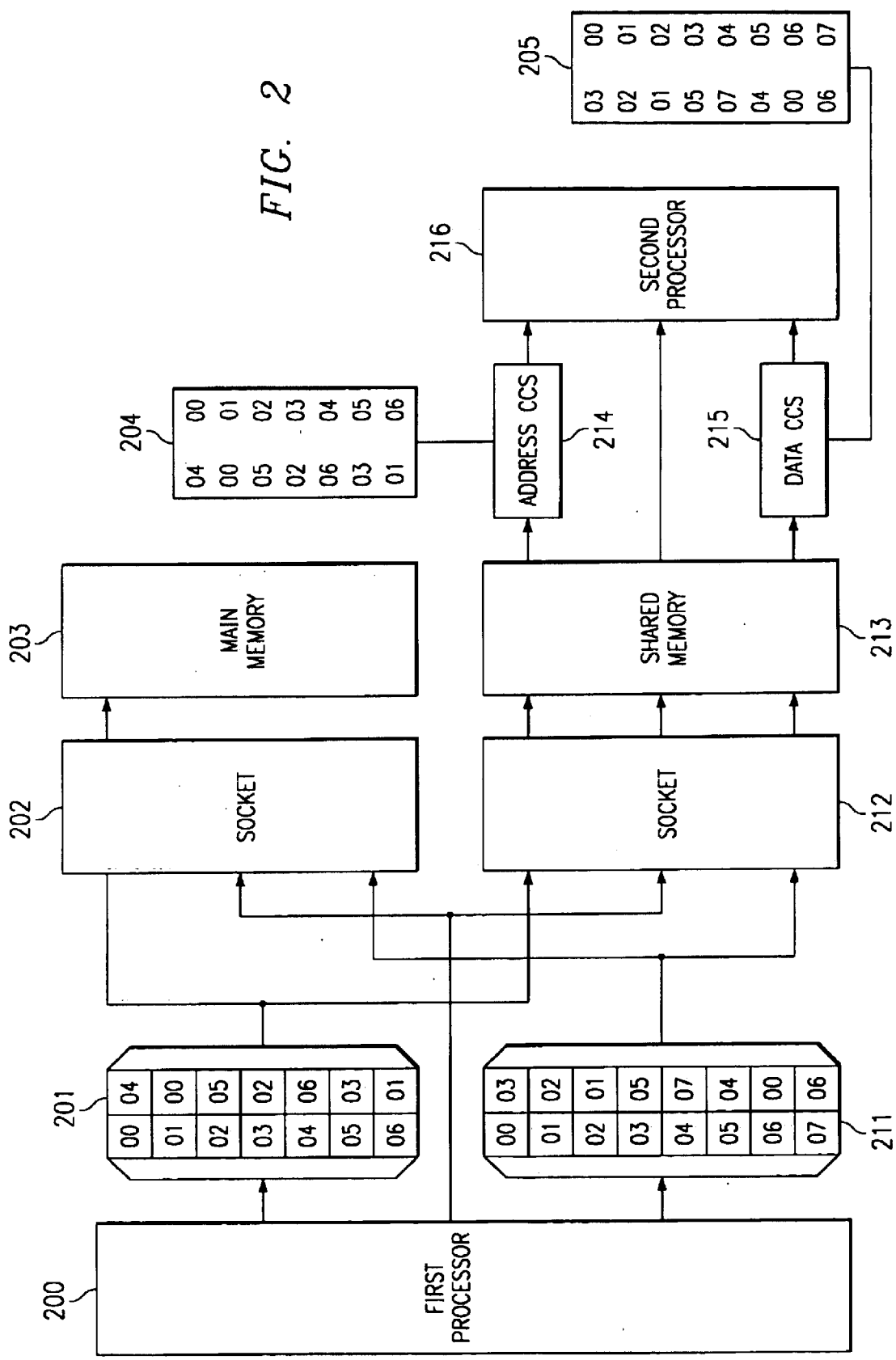
FIG. 2 illustrates a system block diagram after address and data map correction.

The second processor 105 merely interprets the control signals from the first processor 100 to configure the CCS elements 103 and 104 in a deterministic way. Before the address and data maps are determined, both CCS elements could be configured as straight point-to-point connections (as shown in FIG. 1). Regardless of their initial configuration, their final configuration should be to compensate for the differences between the data and address line manipulations between the first processor 100 and shared memory 102, as shown in blocks 120 and 121 as well as any non-CCS manipulations between the second processor 105 and shared memory 102, if any (none in FIG. 1). FIG. 2 shows the correction being applied in blocks 204 and 205.

Address Mapping

Table 1 shows the patterns written by the instigating processor used to determine the address mapping in a 20-bit address host system. Notice that only one address bit is high (logical '1') in each entry, and the number of data bits that are high match the value of the high address bit. When each pattern is read by the target processor (first processor 100), the processor outputs an address consisting of only one high bit, and examines the data returned. The number of high data bits returned indicates to the target processor which instigating processor address line is mapped to the high address line output by the target processor. Once the target processor queries all 20 addresses, the address CSS element can then be configured with the proper inverse map.

For this method to work, the number of data lines must be equal to or greater than the number of address lines in a given host system. This is true in most of today's host systems. If this were not the case, writing the extra 'ones' could be accomplished by writing all 'zeros' to the address below and writing extra 'ones' (or all 'zeros' if there are no extra 'ones') to the address above each original output address.

Notice that the data mapping need not be corrected to determine the address mapping, because only the number of data bits 'high' at each address is significant, not the placement of the data bits themselves.

It is evident that this method could be expanded or reduced to support host systems with different address bus sizes. Although the method suggested may be the most direct, there are any number of variations that could be used, such as writing patterns to different addresses and using different bit patterns to identify the lines directly, or even a method which uses bit patterns to determine individual address lines only in combination with each other.

TABLE 1

| Address | Data | Used for Detection of |
| --- | --- | --- |
| 0 × 00001 | 0 × 1 | Mapping of address line |
| 0 × 00002 | 0 × 3 | Mapping of address line |
| 0 × 00004 | 0 × 7 | Mapping of address line |
| 0 × 00008 | 0 × F | Mapping of address line |
| 0 × 00010 | 0 × 1F | Mapping of address line |
| 0 × 00020 | 0 × 3F | Mapping of address line |
| 0 × 00040 | 0 × 7F | Mapping of address line |
| 0 × 00080 | 0 × FF | Mapping of address line |

TABLE 1-continued

| Address | Data | Used for Detection of |
| --- | --- | --- |
| 0 × 00100 | 0 × 1FF | Mapping of address line |
| 0 × 00200 | 0 × 3FF | Mapping of address line |
| 0 × 00400 | 0 × 7FF | Mapping of address line |
| 0 × 00800 | 0 × FFF | Mapping of address line |
| 0 × 01000 | 0 × 1FFF | Mapping of address line |
| 0 × 02000 | 0 × 3FFF | Mapping of address line |
| 0 × 04000 | 0 × 7FFF | Mapping of address line |
| 0 × 08000 | 0 × FFFF | Mapping of address line |
| 0 × 10000 | 0 × 1FFFF | Mapping of address line |
| 0 × 20000 | 0 × 3FFFF | Mapping of address line |
| 0 × 40000 | 0 × 7FFFF | Mapping of address line |
| 0 × 80000 | 0 × FFFFF | Mapping of address line |

Address Inversion

In addition to a simple (relative) reordering of address lines, there exist systems in which the majority of address lines are inverted. The patterns in Table 1 can still be used in this case. However, the target device must look for the patterns in additional address locations depending on the nature of the inversion.

In most computer motherboards with address line inversion, only two address lines above A6 are not inverted. These are A10 and A11 which have some special function. However, these lines cannot be rearranged to be anywhere. Due to the nature of synchronous dynamic random access memory (SDRAM) practice, these lines can only be in positions A7 through A19, or 14 possible locations. Since we do not know a priori which lines are which, all possibilities must be looked at. Looking just at the effect of having inversion of 12 out of 14 lines, we can see that there are 91 possibilities. By letting a 0 represent no inversion and a 1 represent an inversion, the question becomes how many combinations there are with two 0s and twelve 1s. We are not concerned at this point about which 0 represents A10 or A11. The goal here is just to find the locations in the address space to check for the patterns in Table 1 to determine the address line rearrangement. Where the patterns are found determines the address line inversion, so no extra patterns are needed. If we fix the first 0 at the first position, there are 13 possible patterns made by moving the second 0 to the remaining 13 positions. Then fixing the first 0 at the second position there are 12 new patterns possible by relocating the second 0. Continuing in this way we can count 13+12+11+10+9+8+7+6+5+4+3+2+1=91 unique possibilities.

This allows for an efficient exhaustive search to be employed when looking for the patterns (each original address could be mapped to only 91 possible physical addresses which are exhaustively checked).

However, if the amount of address line inversion is completely unknown, then a robust search may need to be employed over the shared memory to find at least one pattern. Once a pattern is found however, the search for the remaining patterns can be continued using this location and the nature of address lines to limit the search. For instance, once an address line is discovered, the remaining search can be reduced by half, since a constant signal can be applied to that particular address line in the remaining search.

While the methods mentioned above may be used to speed up the process of finding address patterns, a simple scan of all memory locations will also work. Once all these patterns are found, in effect each address line location has been marked by an unique number of bits set to 1, and thus sufficient information exists to completely determine the nature of the relative address line reordering and/or inversion.

Data Mapping

Table 2 shows the patterns written by the instigating processor required to determine the data mapping in a 32-bit data system.

TABLE 2

| Address | Data - Hex | Data - Binary |
|---|---|---|
| N | 0 × FFFF0000 | 11111111111111110000000000000000 |
| N + 1 | 0 × FF00FF00 | 11111111000000001111111100000000 |
| N + 2 | 0 × F0F0F0F0 | 11110000111100001111000011110000 |
| N + 3 | 0 × CCCCCCCC | 11001100110011001100110011001100 |
| N + 4 | 0 × AAAAAAAA | 10101010101010101010101010101010 |

Since each 32-bits have the same data line re-ordering, (since they use the same physical data lines) and the patterns are orthogonal, the patterns can be read by the target processor and combined to determine the single unique re-ordering applied to each 32-bit group. These particular patterns were chosen so that the 0th bit will receive a 0 signal from each group. Likewise the 1st bit will receive a 0, 0, 0, 0, 1 signal from the N to the N+4 groups respectively, and so on up to the 31st bit which will receive a 1, 1, 1, 1, 1 signal from the N to the N+4 groups respectively. This makes it easy for the target processor to see how the data lines were relatively arranged. For instance, for the 5th data line, the line which received the 0, 0, 1, 0, 1 signal from the N to the N+4 groups respectively will be the correct data line (matching the 5th line on the 'other side'). In fact, if one takes the matrix of binary data written between addresses N and N+4, and rotates it 90 degrees counterclockwise, a table of binary values from 0 to 32 is produced, and when the target processor reads this data and performs this rotation, the table produced represents in order, how each target processor data line (from 0 to 32) is mapped to each instigating processor data line. A similar method can be used at non-sequential data locations or even the same location at different times, since the data lines are the same. To take a concrete example, suppose that only the 0th and 1st data lines are relatively rearranged between the two processors. Then the pattern written by the first processor as seen by the second at the N to N+4 groups will be 0×FFFF0000, 0×FF00FF00, 0×F0F0F0F0, 0×CCCCCCCC, 0×AAAAAAA9, so looking at just the 0th bit, the signals at the N to N+4 will be 0,0,0,0,1 and looking at just the 1st bit, the signal will likewise be 0,0,0,0,0 indicating clearly that the 0th bit and the 1st bit are relatively rearranged. This whole process can be thought of conceptually as creating a matrix of binary values by stacking the received pattern on top of each other, and rotating it 90 degrees to produce a table indicating which bit is mapped to which. For instance, in the example above, the received patterns can be written as shown in Table 3.

TABLE 3

| N | 11111111111111110000000000000000 |
|---|---|
| N + 1 | 11111111000000001111111100000000 |
| N + 2 | 11110000111100001111000011110000 |
| N + 3 | 11001100110011001100110011001100 |
| N + 4 | 10101010101010101010101010101010 |

And these can be rotated to show a table of relative bit mapping as shown in Table 4.

TABLE 4

| bit 0 | 00000 |
|---|---|
| bit 1 | 00001 |
| bit 2 | 00010 |
| bit 3 | 00011 |
| ... | ... |

Data Inversion

Luckily no cases where data lines are inverted have been encountered. An arbitrary inversion of data lines on top of data and address scrambling and arbitrary address inversion can be considered the ultimate test. However, the principles applied above can be applied here to solve this 'worst case' scenario as well. If in addition to writing the patterns in Tables 1 and 2, the rest of the memory is set to 0×00000000, then any inverted data bits will cause a large number of repeated arbitrary numbers, since the number 0 will always be mapped through the same data inversion and scrambling to the same number. Once the processor reading the patterns determines that the vast majority of the shared memory contains the same arbitrary number, it can apply a direct inversion of all non-zero bits in this number (without any data line rearrangement). This 'inversion map' can then be applied to all signals written or read from shared memory. This will allow all the methods for data mapping, address line mapping and address line inversion to be used since the patterns will be corrected for the data bits which are inverted.

Result

Once the relative data line reordering, inversion and address line reordering and inversion has been determined, the needed correction can be applied in either hardware or software, from either the pattern generating end or the pattern receiving end. For example, the correction mechanism has been implemented using CCS elements on the pattern generating side. These receive special codes that configure hardware switches that compensate for the relative rearrangement previously discovered. It is interesting to note that when presenting these instructions to the second system using the shared memory itself, the first system must also correct for any mismatch in order for the instructions to be recognized correctly by the second system, or use a system that is robust despite any mismatch. One such system could be a sequential series of all 'ones' or all 'zeros' patterns to the same location. In this example, a layer of software is used to pre-correct the codes so they can be recognized by the second system. Once the CCS elements have been properly configured with the proper address and data inverse maps, memory sharing and communication between the first and second processors can begin.

FIG. 2 shows the same system block diagram as that of FIG. 1, but now with the address and data maps corrected. Notice that the CCS elements are configured to be exact inverses of the address and data map present in the first system, so that the data and address lines are correctly matched. In this example, the case of address or data inversion is not shown, but is done in software on the first system. It could also be done in hardware on either system, or in software on the second system.

EXAMPLE CIRCUITS

This section illustrates example circuits which perform the task of the configurable crosspoint switch CCS. An ideal CCS would be comprised of an N×M matrix of configurable zero-delay switches, much like the crossbar integrated circuits available today. If crossbar technology is not available, a similar circuit can be implemented from multiplexers. Implementation with multiplexers may be more desirable in application specific integrated circuit (ASIC) or field programmable gate array (FPGA) technology. Other technologies might also be used here.

EXAMPLE MUX-BASED CCS DATA CORRECTION

FIG. 3 illustrates a multiplexer-based configurable crosspoint switch circuit designed to correct for data mapping present in typical host systems. This circuit is completely configurable, but its limitation is that only entire bytes can be rearranged within a 32-bit word twister 300. Within these bytes, each bit can also be rearranged using byte twisters 310 311 312 and 313. The byte twister portion of the circuit requires four control words 308 of 24 bits each. Three bits are wired to each multiplexer to control the placement of each bit in every byte. The word twister portion of the circuit requires one control word 309 consisting of 8 bits. Two bits are wired to each multiplexer to control the placement of each byte in the word.

Figure 5:
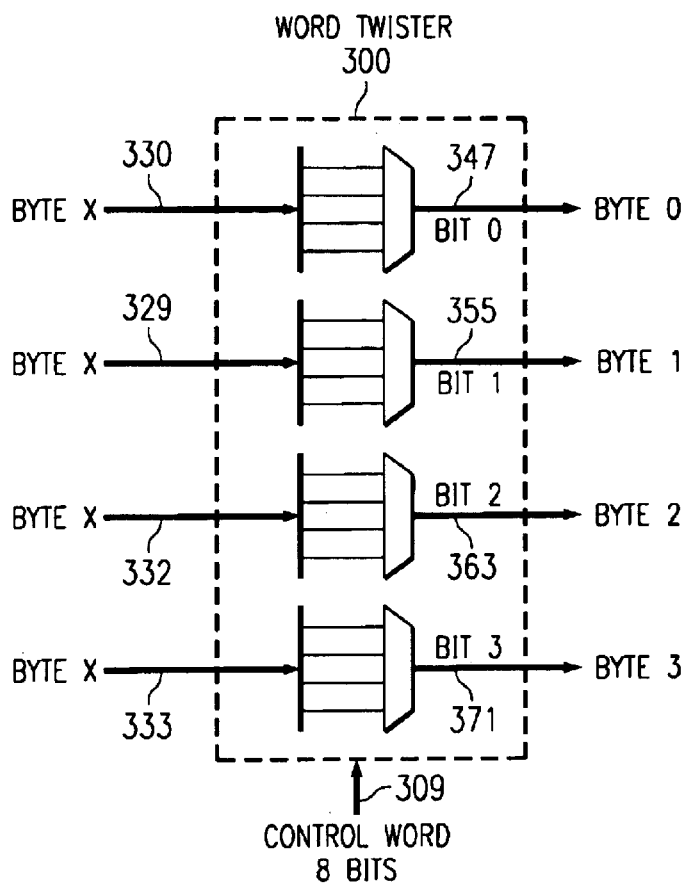
FIG. 5 illustrates the word-twister portion of a multiplexer-based configurable crosspoint switch (CCS) for data correction.

The shared memory data is input in 8-bit bytes 307, 315, 323, and 331. Byte twisters 310, 311, 312, and 313 are depicted in FIG. 4 with input byte 307 and output bits 320, 321, and 327. Word twister 300 illustrated in FIG. 3 provides slave processor output data in bytes 347, 355, 363, and 371. Word twister 300 is depicted in FIG. 5 with inputs 330, 329, 332, and 333 and output bytes 347, 355, 363, and 371.

A circuit configuration such as in FIG. 3 is sufficient for most of conventional systems, since SDRAM control lines are always bundled with data bytes as the smallest granularity. For simplicity, all data lines in this circuit are assumed to be bi-directional. It should be noted that some systems rearrange bytes across the 32-bit boundary. To compensate for this case, a layer of host software is used to rearrange bytes so that they are grouped within a 32-bit boundary. After this, the hardware finishes the word twisting and byte twisting.

MULTIPLEXER-BASED CCS FOR ADDRESS CORRECTION

Figure 6:
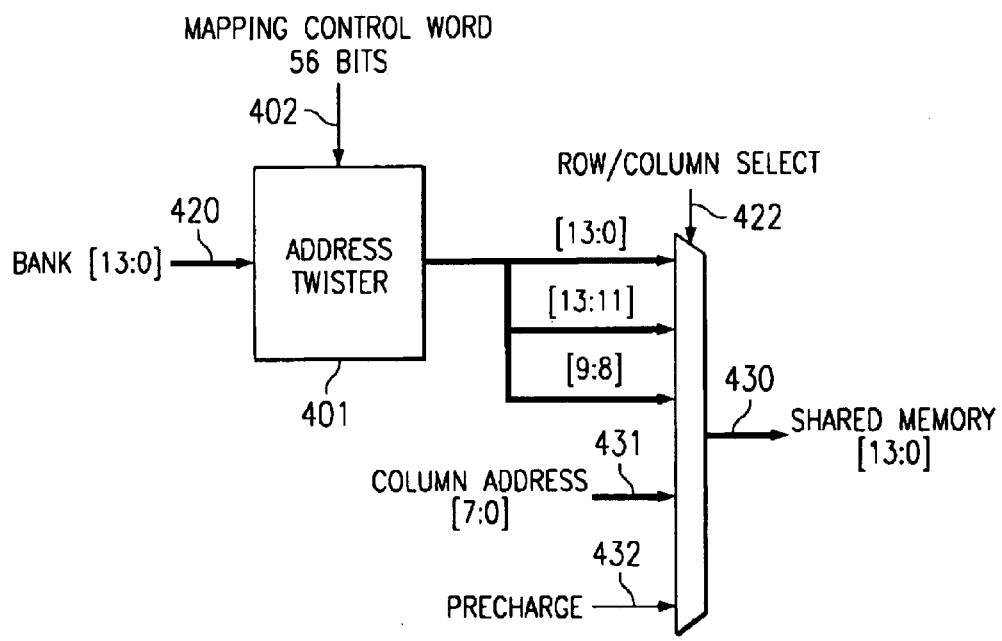
FIG. 6 illustrates a multiplexer-based configurable crosspoint switch (CCS) for address correction.

FIG. 6 shows a multiplexer-based circuit designed to correct for address mapping present in typical host systems. This circuit is completely configurable, but note that only row addresses can be rearranged within a full SDRAM address word (address twister portion). The address twister 401 portion of the circuit receives bank bits 420 and requires one control word 402 consisting of 56 bits. Four bits are wired to each multiplexer to control the placement of each row address line (see FIG. 7).

Such a circuit is sufficient for most conventional systems, since host chipsets typically do not rearrange the SDRAM column address bits if only 8 column address bits are used (×16 SDRAM) The multiplexer selects output 430 as either the rearranged row address or the column address 431 and precharge 432 as controlled by the select signal 422. These circuits are typical examples of applications for the present invention. FIG. 7 illustrates the address portion of the multiplexer based CCS depicted in FIG. 6 for address correction. Mapping control word 402 is supplied to 14 multiplexers which supply respective bits 0 to 13 (410 to 413). Each multiplexer selects one bit of the address in 420 for address out 419.

What is claimed is:

1. A method of detecting the existence of rearrangement of first address lines by which a first data processor accesses a shared memory relative to second address lines by which a second processor accesses the shared memory, said method comprising the steps of:

writing unique data to the shared memory from the first data processor via the first address lines to each address having a single address bit in a first digital state and all remaining address bits in a second digital state opposite to said first digital state;

reading from the shared memory to the second data processor via the second address lines from each address having a single address bit in said first digital state and all remaining address bits in said second digital state; and determining rearranged first address lines by correlating read address lines reading said unique data with write address lines writing said unique data.

2. The method of claim 1, wherein:

said unique data consists of a number of bits in said first digital state corresponding to a bit position having said first digital state in said writing via said first address lines.

3. The method of claim 1, further comprising the step of:

rearranging said second address lines corresponding to the determined rearranged first address lines for access to the shared memory by the second processor.

4. A method of detecting the existence of inversion of first address lines by which a first data processor accesses a shared memory relative to second address lines by which a second processor accesses the shared memory, said method comprising the steps of:

writing unique data to the shared memory from the first data processor via the first address lines to each address having a single address bit in a first digital state and all remaining address bits in a second digital state opposite to said first digital state;

reading from the shared memory to the second data processor via the second address lines from each address having a single address bit in said first digital state and all remaining address bits in said second digital state;

reading from the shared memory to the second data processor via the second address lines from each address having a single address bit in said first digital state and all remaining address bits in said second digital state for each combination of expected inverted first address lines; and determining inverted first address lines by correlating read address lines reading said unique data with write address lines writing said unique data.

5. The method of claim 4, wherein:

said unique data consists of a number of bits in said first digital state corresponding to a bit position having said first digital state in said writing via said first address lines.

6. The method of claim 4, further comprising the step of:

inverting the second address lines corresponding to the determined inverted first address lines for access to said shared memory by said second processor.

7. A method of detecting the existence of rearrangement of first data lines by which a first data processor accesses a shared memory relative to second data lines by which a second processor accesses the shared memory, said method comprising the steps of:

writing a plurality of predetermined data words to the shared memory from the first data processor via the first data lines to at least one predetermined address, a first data word having a least significant half of bits of a first digital state and a most significant half of bits of a second digital state, each subsequent data word having alternating groups of bits of said first digital state and said second digital state of half the number of bits of a prior data word, a next to last data word having alternating pairs of bits of said first digital state and said second digital state, a last data word having alternating bits of said first digital state and said second digital state;

reading said plurality of predetermined data words from the shared memory to the second data processor via the second data lines from each of said at least one predetermined address; and determining rearranged first data lines by correlating a bit value for a particular bit of said plurality of predetermined data words with a first data line.

8. The method of claim 7, wherein:

said at least one predetermined address consists of a single predetermined address; and said step of writing to said at least one predetermined address consists of sequentially writing each predetermined data word to said single predetermined address; and said step of reading from said at least one predetermined address consists of sequentially reading each predetermined data word from said single predetermined address.

9. The method of claim 7, wherein:

said at least one predetermined address consists of a plurality of sequential addresses.

10. The method of claim 7, further comprising the step of:

rearranging said second data lines corresponding to the determined rearranged first data lines for access to said shared memory by said second processor.

11. A method of detecting the existence of inversion of first data lines by which a first data processor accesses a shared memory relative to second data lines by which a second processor accesses the shared memory, said method comprising the steps of:

writing a predetermined data word having all bits in a first digital state to the shared memory from the first data processor via the first data lines to each address within the shared memory;

reading from the shared memory to the second data processor via the second data lines from each address within the shared memory; and determining inverted first data lines by correlating read data lines reading a second digital state opposite to said first digital state with write data lines writing corresponding bits of said predetermined data word.

12. The method of claim 11, further comprising the step of:

inverting said second data lines corresponding to the determined inverted first data lines for access to said shared memory by said second processor.

* * * * *